Benjamin M. Smith.
Impt. in Strengthening Button Holes.
Reissue.

4303

REISSUED MAR 14 1871

Witnesses.
N. S. Miller.
R. H. Whittlesey

Inventor.
Benj. M. Smith,
by Geo. W. Rothwell
asso. atty

UNITED STATES PATENT OFFICE.

BENJAMIN M. SMITH, OF NEW YORK, N. Y., ASSIGNOR TO CHARLES GOODYEAR, JR., AND LEONARD A. SPRAGUE, OF SAME PLACE.

IMPROVEMENT IN BUTTON-HOLES.

Specification forming part of Letters Patent No. 75,212, dated March 3, 1868; Reissue No. 4,303, dated March 14, 1871.

*To all whom it may concern:*

Be it known that I, BENJAMIN M. SMITH, of the city, county, and State of New York, have invented a new and useful Improvement in Button-Holes, and assigned the same to CHARLES GOODYEAR, Jr., and LEONARD A. SPRAGUE, of the city, county, and State of New York; and I do hereby declare that the following is a full, clear, and exact description of the same, reference being had to the accompanying drawings, and to the letters of reference marked thereon, making a part of this specification, in which—

Figure 1:
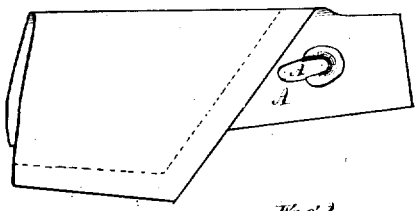
Figure 2:
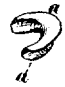

Figure 1 is a side view of a portion of a collar formed or furnished with a button-hole made according to my invention. Fig. 2 is a detached view of one portion of the invention.

Similar letters of reference indicate corresponding parts in both figures.

The object of this invention is to provide a means whereby the button-holes of apparel may be made much stronger than when formed in the usual manner, without materially impairing that flexibility required therewith to permit their manipulation in buttoning or unbuttoning, as the case may be.

The invention consists in a metallic shield-piece applied to that portion only of the button-hole which is the most exposed to strain or tension when in use, so as to distribute such strain upon a greater extent of the sides of the button-hole, thus securing a proportionally greater resistance thereto than would otherwise be the case, a sufficient portion of the button-hole being left free or unprotected to insure the flexibility required in manipulating or adjusting the same.

To enable others to understand the nature and construction of my invention, I will proceed to describe it with reference to the drawings, wherein my invention is shown as applied to paper collars.

A button-hole of any suitable form or construction, formed in this case by excising it, is indicated at A, situated in the ordinary or in any appropriate position. Fitted within or at that part or side of the button-hole at which the greatest strain or tension is exerted thereon is a shield-piece, *a*, which is made of a single piece of sheet metal curved to fit that portion of the button-hole which it is designed to strengthen or protect, and is furthermore folded in such manner that a space, *a'*, is provided between its two flat sides, as shown in Fig. 2. When the shield-piece is fitted into its place, the part or side of the button-hole to be protected is inserted within the space *a'*, just mentioned, and the two flat sides of the shield-piece being compressed toward each other the said shield-piece is thus firmly attached to the collar, and, covering the portion of the button-hole most exposed to the action of the button, receives not only the wear and abrasion exerted thereon by the said button when in use, but, extending around a considerable portion of the button-hole, distributes the strain or tension of the button over a larger portion of the fabric than would otherwise be the case, and thus effectually prevents the hole from "tearing out" or being ruptured from such strain, at the same time that the flexibility required in manipulating the button-hole is permitted by the free condition of that portion thereof not covered or protected by the shield-piece.

It is obvious that my improved re-enforced button-hole is applicable to all articles of apparel, whether made of textile or other material.

I do not confine myself to any particular shape either of the button-hole or shield.

What I do claim as new, and desire to secure by Letters Patent, is—

The shield-piece *a*, made from a single piece of metal folded to overlap and protect the wearing portion of a button-hole, the other part of said button-hole being left flexible, substantially as described.

B. M. SMITH.

Witnesses:
CHAS. T. DE FOREST,
GOWEN H. CRAGG.